J. CONTE.
FEED MECHANISM FOR CANDY COATING MACHINES.
APPLICATION FILED FEB. 14, 1914.
1,138,356.
Patented May 4, 1915.
3 SHEETS—SHEET 2.
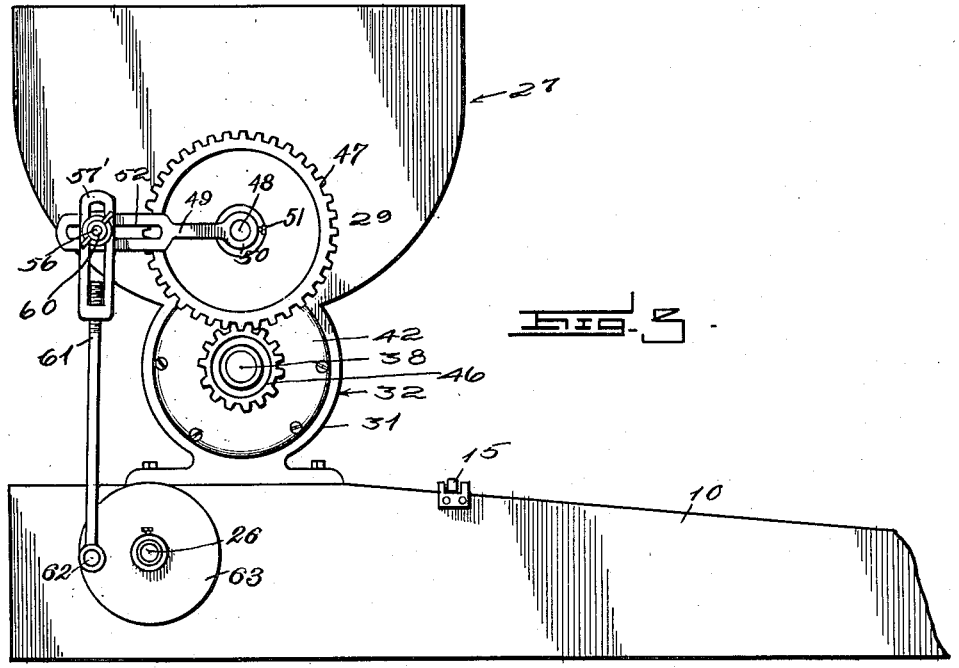
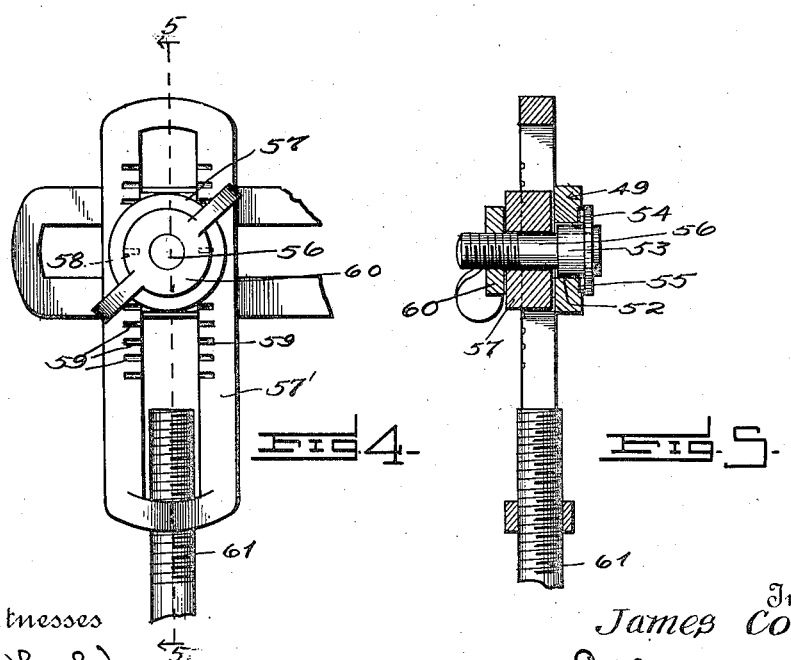
Inventor
James Conte, J. CONTE.
FEED MECHANISM FOR CANDY COATING MACHINES.
APPLICATION FILED FEB. 14, 1914.
1,138,356.
Patented May 4, 1915.
3 SHEETS—SHEET 3.
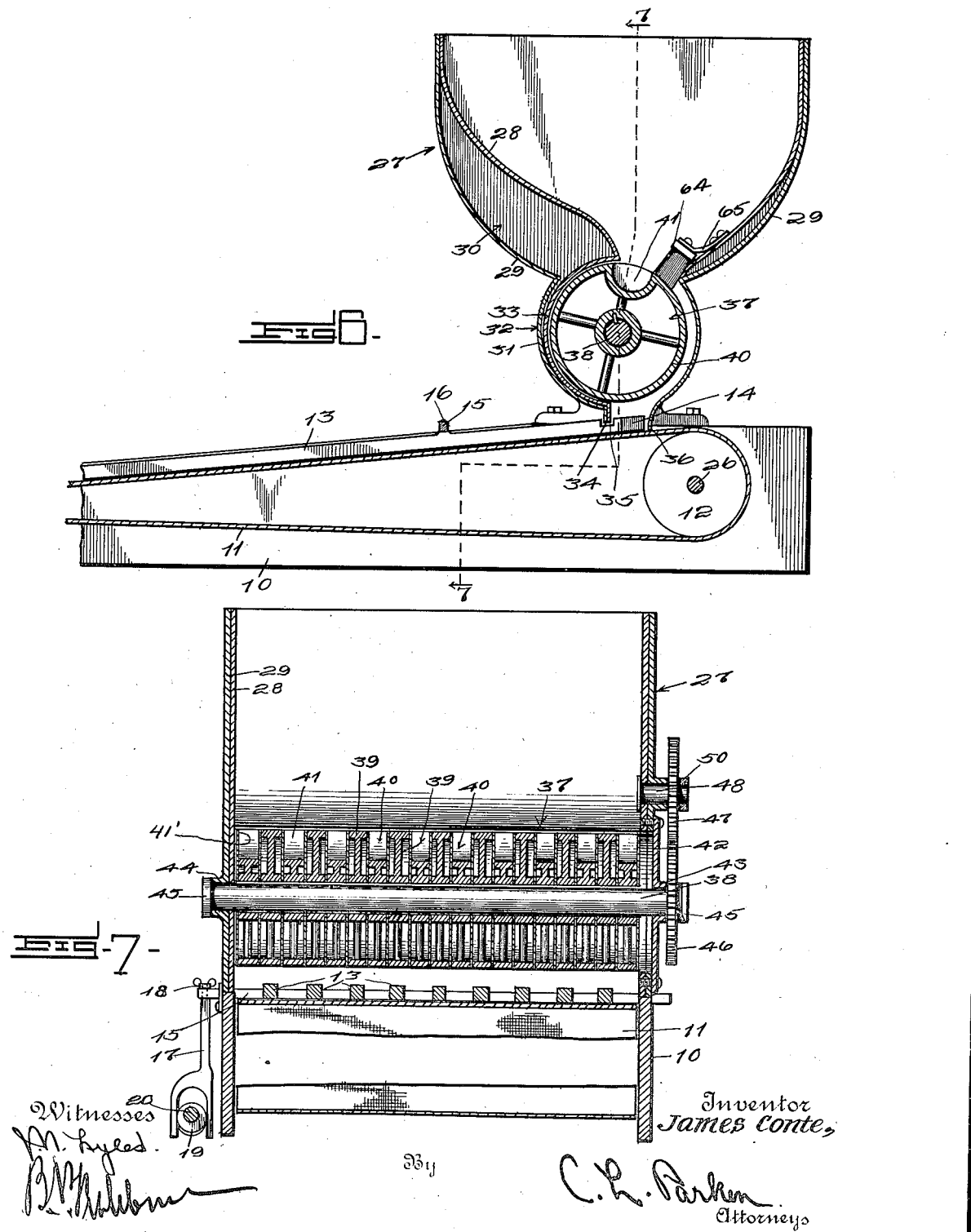
Witnesses
Inventor
James Conte,
By
C. L. Parker
Attorneys

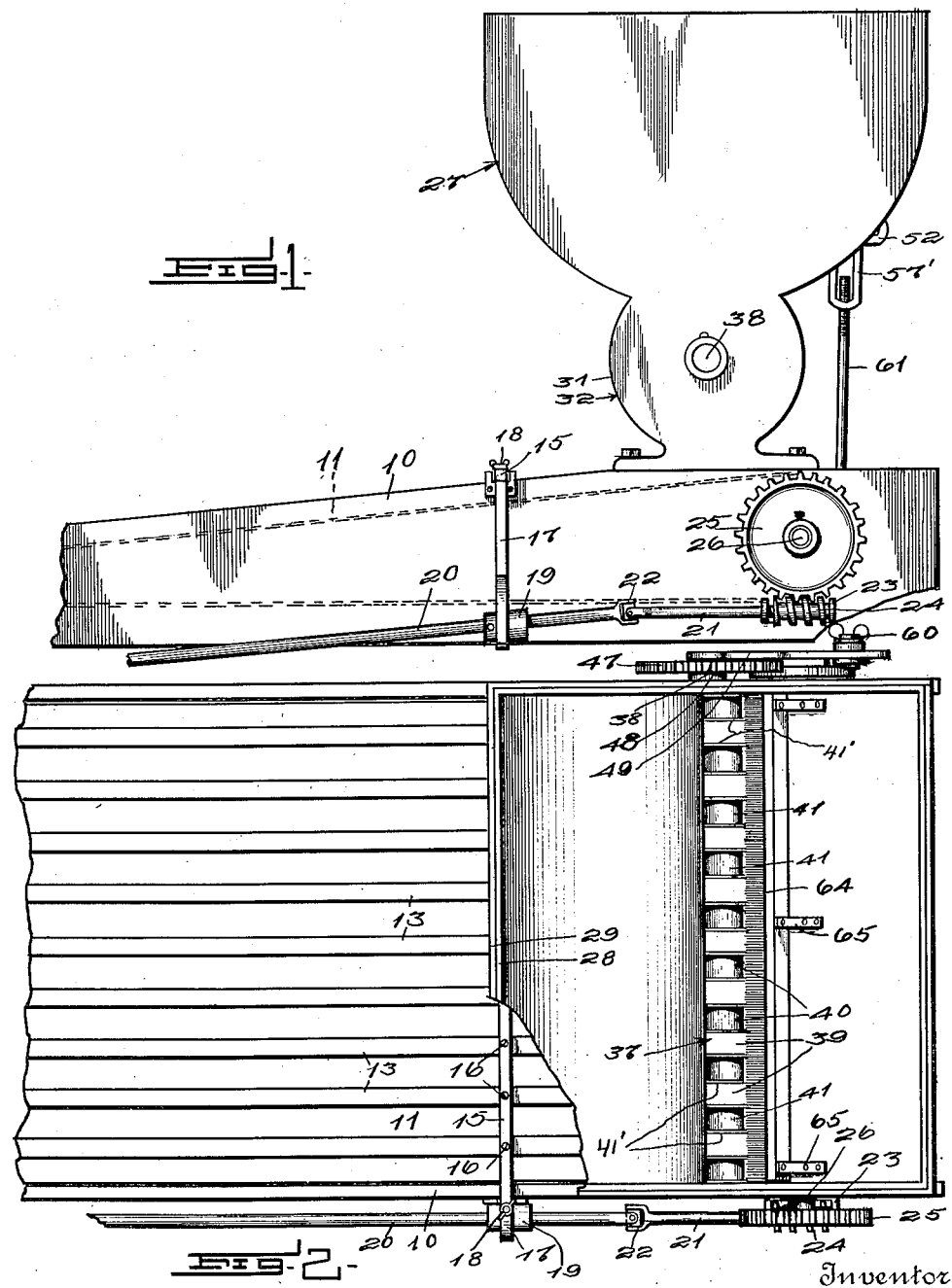

UNITED STATES PATENT OFFICE.

JAMES CONTE, OF LIMA, OHIO.

FEED MECHANISM FOR CANDY-COATING MACHINES.

1,138,356.  Specification of Letters Patent.  Patented May 4, 1915.

Application filed February 14, 1914. Serial No. 818,710.

*To all whom it may concern:*

Be it known that I, JAMES CONTE, a citizen of the United States, residing at Lima, in the county of Allen and State of Ohio, have invented certain new and useful Improvements in Feed Mechanism for Candy-Coating Machines, of which the following is a specification.

My invention relates to improvements in feeding mechanism for candy coating machines, adapted to be used in connection with a candy coating machine, of the type shown in my Patent No. 1,079,165, granted under date of November 18, 1913, but is not of course solely restricted to such use.

An important object of the invention is to provide means of the above mentioned character, which is adapted to intermittently discharge desired amounts of kernels or other material into spaced pockets or openings occurring between the shaker bars arranged longitudinally of a preferably endless belt conveyer embodied in a candy coating machine.

A further object of the invention is to provide means for discharging the kernels or other articles within the pockets or openings between the shaker bars arranged upon the endless belt of the candy coating machine, without discharging the kernels upon the shaker bars.

A further object of the invention is to provide means for accurately adjusting the extent of movement of the valve or feed element of the mechanism.

A further object of the invention is to provide means of the above mentioned character embodying a plurality of wheels removably mounted upon a shaft, certain of the wheels being blank and certain of the wheels provided with pockets, whereby the wheels may be readily removed from and placed upon the shaft for increasing or decreasing the number of pockets, as may be found necessary.

A further object of the invention is to provide means of the above mentioned character, which are simple in construction, inexpensive to manufacture, convenient in use, reliable in operation without the aid of an attendant, strong and durable.

Other objects and advantages of the invention will be apparent during the course of the following description.

In the accompanying drawings forming a part of this specification and in which like numerals are employed to designate like parts throughout the same, Figure 1 is an elevation of one side of the feeding mechanism embodying my invention, showing the same applied to one end of a candy coating machine, Fig. 2 is a plan view of the same, Fig. 3 is an elevation of the opposite side of the feeding mechanism, Fig. 4 is an enlarged detail elevation of the adjusting element embodied in the operating means for the valve or feed element. Fig. 5 is a section taken on line 5—5 of Fig. 4, Fig. 6 is a central longitudinal sectional view through the feeding mechanism, and, Fig. 7 is a transverse sectional view through the feeding mechanism, taken on line 7—7 of Fig. 6.

In the drawings, wherein for the purpose of illustration is shown a preferred embodiment of my invention, the numeral 10 designates a suitably supported horizontal frame within which is mounted a longitudinally extending endless belt conveyer 11, engaging at one end with a roll 12, from which it receives its rotation. The opposite end of the endless belt conveyer 11 engages with a second roll (not shown). Arranged above and slidably engaging with the upper portion of the endless belt conveyer 11 are longitudinally extending and laterally spaced shaker bars 13, the forward or intake ends of which are tapered, as shown at 14. These shaker bars are pivotally connected near their rear or discharge ends with a transverse bar (not shown). The forward or intake ends of the shaker bars 13 are oscillated or vibrated laterally by means of a transversely reciprocated bar 15 with which the same are pivotally connected, as shown at 16. The reciprocatory bar 15 is moved by means of a depending lever 17, which is rigidly connected with one end of the reciprocatory bar 15 by means of a thumb nut 18 or the like. The lower end of the lever 17 is forked, as more clearly shown in Fig. 7, for receiving an operating cam 19. This operating cam is rigidly mounted upon a longitudinally extending drive shaft 20, receiving its rotation from any suitable source of power. It is obvious that the rotation of the cam 19 will effect the oscillatory movement of the forward or intake ends of the shaker bars. The drive shaft 20 is connected with a stub-shaft 21 by means of a universal joint 22. The stub-shaft 21 is journaled in a suitable bearing 23 and is provided therein with a worm 24, engaging a worm wheel 25, which is rigidly mounted upon a shaft 26, having the roll 12 rigidly mounted thereon. It is thus seen that the endless belt conveyer 11 receives its rotation from the drive shaft 20. As the candy coating machine thus described is substantially identical with that shown and described in my Patent No. 1,079,165, granted under date of November 18, 1913, and as such candy coating machine is not claimed *per se*, it is thought that no further disclosure of the same is necessary.

My feeding mechanism embodies a hopper 27, preferably formed of sheet metal, and having inner and outer walls or portions 28 and 29, affording an air space 30 therebetween, as shown. The lower portions of the outer walls 29 are bent to form outer curved horizontally arranged portions 31, forming a feed valve casing 32. One of the inner walls or portions 28 is also extended and bent to form a curved portion 33, arranged inwardly of and adjacent one curved portion 31, the extreme lower ends of these adjacent portions 31 and 33 terminating at a point 34, and fitting within transverse grooves 35 formed through the forward or intake ends of the shaker bars 13, adjacent the tapered ends 14 thereof. The opposite inner wall or portion 28 terminates adjacent the upper edge or portion of the feed valve casing 32, while the last named portion has its extreme lower end terminating at a point 36, arranged contiguous with the endless belt conveyer 11 and forwardly of and adjacent the tapered ends 14 of the shaker bars, as shown.

Mounted to oscillate within the feed valve casing 32 is a feed valve designated as a whole by the numeral 37. This feed valve includes a transverse shaft or spindle 38, suitably journaled within the feed valve casing 32 and arranged eccentrically with relation thereto, as shown. The numerals 39 and 40 designate blank and feed wheels or elements, which are splined from the shaft 38, so that they may rotate therewith and be removed therefrom when desired. The sets of blank wheels 39 are alternately arranged with relation to the feed wheels 40, the blank wheels 39 being arranged above and in alinement with the shaker bars 13, while the feed wheels 40 are in alinement with the spaces between the shaker bars, as shown. Each of the feed wheels 40 has its rim or periphery bent inwardly, forming a suitably large kernel or article receiving pocket 41 having its opposite sides closed preferably by means of disks 41', arranged between the wheels 39 and 40. It is obvious that these pockets may be laterally closed by other means.

In order that the wheels 39 and 40 may be readily removed from the shaft 38, I form one end of the feed valve casing 32 open, such open end being normally closed by a removable door or head 42, carrying one bearing 43 within which the shaft 38 is journaled. The opposite end of this shaft passes through a bearing 44. The longitudinal movement of the shaft 38 is normally prevented by means of clamping rings 45 rigidly detachably connected therewith. The feed valve 37 receives an oscillatory movement, the same being turned back and forth for approximately one-half of a revolution by a pinion 46, rigidly connected with the opposite end of the shaft 38, said pinion in turn engaging and being driven by a pinion 47, which is rigidly mounted upon a rotatable stub-shaft 48. This rotatable stub-shaft is oscillated or turned back and forth for approximately one-half of a revolution by a crank 49, the inner end of which is provided with a head 50, receiving the outer end of the stub-shaft 48 and clamped thereto by means of a clamping bolt 51, or the like. The crank 49 has its outer portion enlarged and provided with a longitudinally extending slot 52, for receiving therein an apertured pivotal adjusting block 53, (see Figs. 4 and 5), provided with teeth 54, adapted to engage with teeth 55 formed upon the inner face of the enlarged portion of the crank. This apertured block 53 pivotally receives a bolt 56, passing through the slot 52 and through an apertured pivoted adjusting block 57 arranged within an open frame 57' and provided with teeth 58, to engage teeth 59, formed upon the outer side of the frame or head 57'. The outer end of the bolt 56 is screw-threaded for receiving a winged clamping nut 60. By this construction the frame 57' may be vertically or horizontally moved with respect to the crank 49, and locked thereto in adjustment at a desired position, without effecting the free pivotal connection between these parts. The lower end of the frame 57' is provided with a screw-threaded opening for receiving a screw-threaded portion of a pitman 61, the lower end of which is pivotally connected, as shown at 62, with a crank disk 63, rigidly mounted upon the opposite end of the shaft 26. It is thus seen that the rotation of the shaft 26 will impart an oscillatory or back and forth turning movement to the feed valve 37, alternately and periodically bringing the pockets 41 into registration with the lower outlet end of the hopper and into registration with the lower outlet opening of the valve casing 32, occurring between the points 34 and 36.

Arranged within the lower portion of the hopper is a brush 64, extending longitudinally through the entire length of the hopper and attached thereto by a bracket or brackets 65. This brush operates in slidable engagement with the blank and feed wheels and when the pocket 41 occupies the starting position, as shown in Fig. 6, the brush is arranged adjacent the starting or leading ends of the pockets. The function of this brush is to prevent the improper passage of the kernels between the feed valve 37 and the wall of the valve casing 32, and also to sweep or level off the contents of the pockets.

The operation of the apparatus is as follows: The rotation of the drive shaft 20 is imparted to the transverse reciprocatory bar through the medium of elements 17 and 19, such bar swinging the intake end of the shaker bars 13 laterally. This swinging movement of the shaker bars is preferably so timed in operation that the shaker bars occupy the normal or starting position parallel with the longitudinal axis of the conveyer, when the pockets 41 move downwardly to register with and discharge their contents into the opening or spaces occurring between these shaker bars, whereby all of the kernels or other material will be fed into said spaces or openings and not upon the shaker bars. The rotation of the shaft 20 is also imparted to the stub-shaft 21, carrying the worm 23, which rotates the worm wheel 25. The worm wheel 25 drives the endless belt conveyer 11 and shaft 26. The shaft 26, (see Fig. 3) rotates the crank disk 63, which effects an up and down movement of the pitman 61. This movement of the pitman swings the crank or lever 49 up and down, whereby the valve or feed element 37 is turned back and forth, so that the pockets 41 alternately assume position adjacent the lower outlet end of the hopper 27 and the lower outlet end of the feed valve casing 32 or adjacent the intake ends of the shaker bars 13. It is obvious that the extent of movement imparted to the feed valve or feed element 37 may be regulated by manipulating the adjustable pivotal means including the bolt 56.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described my invention, what I claim is—

1. The combination with a candy coating machine embodying a conveyer and longitudinally extending and laterally spaced shaker bars arranged thereon, of a valve casing extending transversely of the conveyer and arranged near the intake ends of the shaker bars, a valve mounted within the valve casing and embodying a plurality of alternately arranged pockets and blank wheels, and means to move the valve.

2. The combination with a candy coating machine embodying an endless belt conveyer and longitudinally extending and laterally spaced shaker bars arranged above the same, of a valve casing extending transversely of the endless belt conveyer and arranged near the intake ends of the shaker bars, a rotatable shaft extending longitudinally within the valve casing, a plurality of wheels mounted upon the shaft and provided with pockets, a plurality of blank wheels arranged upon the shaft in alternate relation to the pockets, means to laterally move the shaker bars, and means to rotate the shaft.

In testimony whereof I affix my signature in presence of two witnesses.

JAMES CONTE.

Witnesses:
JAMES ALOISE,
BARNEY ARBANA.